US007990696B2

United States Patent
Zhou et al.

(10) Patent No.: US 7,990,696 B2
(45) Date of Patent: Aug. 2, 2011

(54) PORTABLE ELECTRONIC DEVICE

(75) Inventors: Xin-Quan Zhou, Shenzhen (CN); Hsiao-Hua Tu, Taipei (TW); Ye Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 111 days.

(21) Appl. No.: 12/550,953

(22) Filed: Aug. 31, 2009

(65) Prior Publication Data

US 2010/0124001 A1  May 20, 2010

(51) Int. Cl.
G06F 1/16 (2006.01)

(52) U.S. Cl. ......... 361/679.3; 361/679.55; 361/679.56; 455/575.1; 455/575.4

(58) Field of Classification Search .............. 361/679.56
See application file for complete search history.

(56) References Cited

U.S. PATENT DOCUMENTS

| 6,961,593 | B1 * | 11/2005 | Lonka et al. ................. 455/573 |
| 7,353,053 | B2 * | 4/2008 | Prichard et al. ............ 455/575.4 |
| 7,428,430 | B2 * | 9/2008 | Ahn et al. .................. 455/575.4 |
| 7,692,717 | B2 * | 4/2010 | Yoo et al. ....................... 348/373 |
| 7,830,661 | B2 * | 11/2010 | Sween et al. ................... 361/695 |
| 2001/0031644 | A1 * | 10/2001 | Eromaki ........................ 455/550 |
| 2004/0198477 | A1 * | 10/2004 | Jung et al. .................. 455/575.4 |
| 2005/0049019 | A1 * | 3/2005 | Lee ............................. 455/575.4 |
| 2005/0064921 | A1 * | 3/2005 | Jeong et al. ................ 455/575.4 |
| 2005/0221873 | A1 * | 10/2005 | Kameyama et al. ....... 455/575.4 |
| 2009/0036182 | A1 * | 2/2009 | Chen ........................... 455/575.4 |
| 2009/0212675 | A1 * | 8/2009 | Zhang et al. .................. 312/237 |

* cited by examiner

*Primary Examiner* — Lisa Lea-Edmonds
*Assistant Examiner* — Anthony Q Edwards
(74) *Attorney, Agent, or Firm* — Steven M. Reiss

(57) ABSTRACT

A portable electronic device comprises a cover member, a body member, and a power generating assembly. The cover member is slidably mounted to the body member. The power generating assembly includes a power generating device and a rack assembly. The power generating device includes a toothed gear and a stator. The toothed gear is rotatably clockwise or counter clockwise mounted to the stator. The stator is fixed to the body member. The rack assembly includes a fastening portion and a rack portion opposite to the fastening portion. The fastening portion is fixed to the cover member. The rack portion meshes with the toothed gear, thus the power generating device driving the rack assembly and the cover member to slide relative to the body member.

15 Claims, 4 Drawing Sheets

PORTABLE ELECTRONIC DEVICE

BACKGROUND

1. Technical Field

The present disclosure relates to portable electronic device, particularly, to a sliding-type portable electronic device.

2. Description of Related Art

Portable electronic devices may be classified into three types: bar-type, flip-type, and sliding-type. A typical sliding-type portable electronic devices includes a sliding cover and a main body. A typical driving mechanism uses an elastic member. One end of the elastic member is connected to the main body, and the other end is connected to the sliding cover. The elastic member provides elastic force to drive the sliding cover to slide relative to the main body.

However, this driving mechanism is relatively complicated in structure, and it's difficult to control the sliding cover to stop at a specific location.

Therefore, there is room for improvement within the art.

BRIEF DESCRIPTION OF THE DRAWINGS

Many aspects of the portable electronic device can be better understood with reference to the following drawings. These drawings are not necessarily drawn to scale, the emphasis instead being placed upon clearly illustrating the principles of the present portable electronic device. Moreover, in the drawings like reference numerals designate corresponding sections throughout the several views.

DETAILED DESCRIPTION

Figure 1:
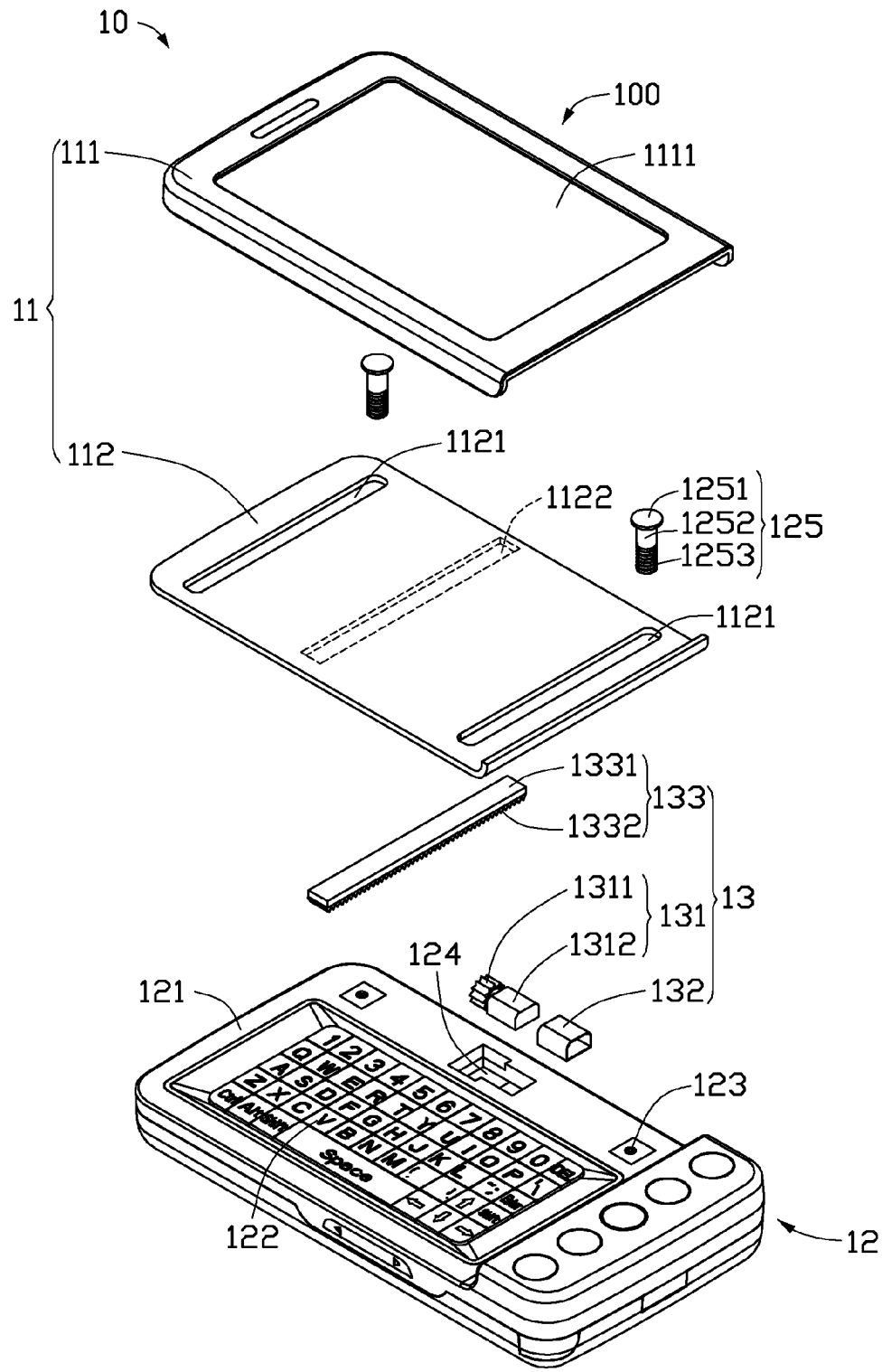
FIG. 1 is an isometric, exploded view of a portable electronic device, in accordance with an exemplary embodiment.
Figure 2:
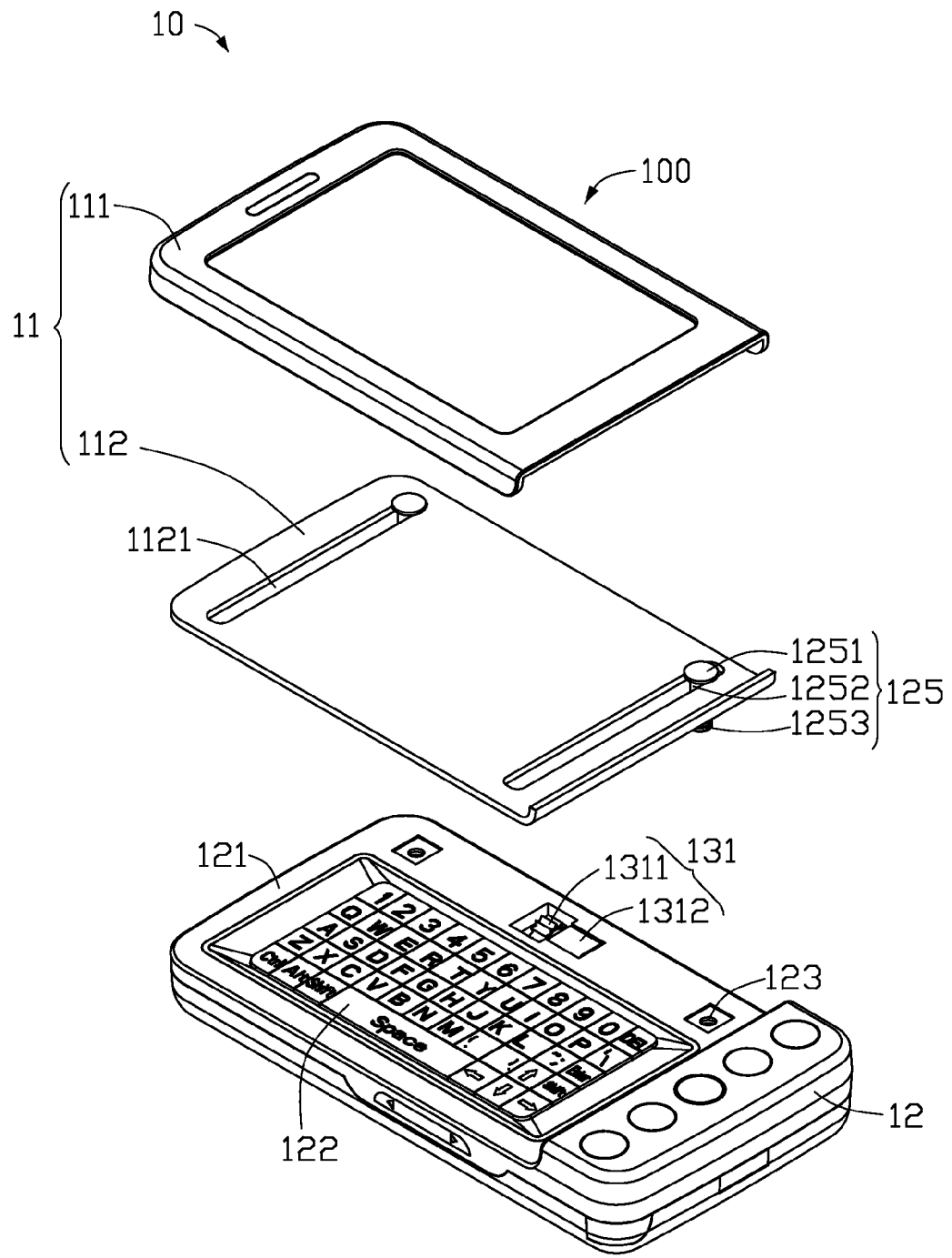
FIG. 2 is a partially assembled view of the portable electronic device shown in FIG. 1, viewed from another aspect.

FIGS. 1 and 2 show an exemplary portable electronic device 10. The portable electronic device 10 includes a cover member 11, a body member 12, and a power generating assembly 13. The cover member 11 is slidably mounted to the body member 12, and is driven by the power generating assembly 13.

The cover member 11 includes an upper cover 111 and a lower cover 112. The upper cover 111 is integrated with the lower cover 112. The upper cover 111 includes a screen 1111 used to display information. The lower cover 112 is generally a cover sheet, and includes two sliding slots 1121 and a receiving cavity 1122. The sliding slots 1121 are respectively defined through the lower cover 112 and at opposite ends of the lower cover 112. The receiving cavity 1122 faces away from the upper cover 111. The receiving cavity 1122 is parallel with and disposed between the two sliding slots 1121.

The body member 12 includes a mounting portion 121 facing the cover member 11. The mounting portion 121 includes a keypad 122, two fastening holes 123, and a mounting slit 124. The keypad 122 is preferred to be a QWERTY keypad, to facilitate user input of information. The two fastening holes 123 are configured to cooperate with typical fasteners e.g., screws 125 to slidably mount the lower cover 112 to the body member 12. Each screw 125 is generally "T"-shaped, and includes a resisting portion 1251, a sliding portion 1252, and a screw head 1253. The sliding portion 1252 connects the resisting portion 1251 with the screw head 1253. Each screw 125 is inserted into a corresponding sliding slot 1121, with the resisting portion 1251 disposed between the upper cover 111 and the lower cover 112, and the screw head 1253 being screwed into a corresponding fastening hole 123. Thus, the sliding portions 1252 is slidable in the sliding slots 1121. The mounting slit 124 is used to mount the power generating assembly 13 therein.

The power generating assembly 13 includes a power generating device 131, a sheath 132, and a rack assembly 133. In this embodiment, the power generating device 131 includes a toothed gear 1311, a stator 1312, and a conventional electrical power source and control switches (neither of which are shown). The toothed gear 1311 can be clockwise or counter clockwise rotatably mounted to the stator 1312. The stator 1312 is received in the sheath 132 made of rubber and then inserted in the mounting slit 124, with the toothed gear 1311 partially and rotatably received in the mounting slit 124. The sheath 132 made of rubber is not only used to fixedly mounts the stator 1312 in the mounting slit 124, but also alleviates the shaking of the body member 12 when the power generating assembly 13 actuates to drive the cover member 11 slide relative to the body member 12. The rack assembly 133 is generally a bar sheet, and includes a fastening portion 1331 and a rack portion 1332 opposite to the fastening portion 1331. The fastening portion 1331 is embedded in the receiving cavity 1122. The rack portion 1332 meshes with the toothed gear 1311 in a manner that rotation of the toothed gear 1311 is converted into sliding movement of the rack assembly 133, such that the power generating device 131 can drive the rack assembly 133 to slide relative to the body member 12.

Figure 3:
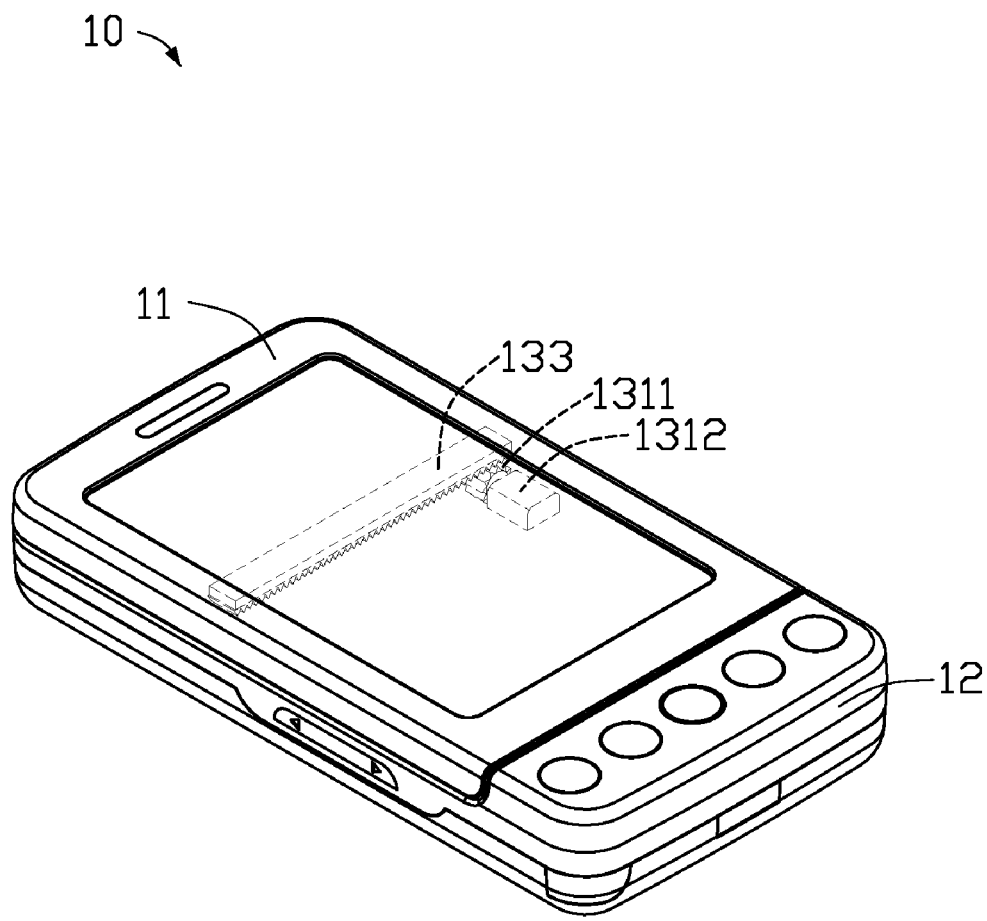
FIG. 3 is an assembled view of the portable electronic device shown in FIG. 2.
Figure 4:
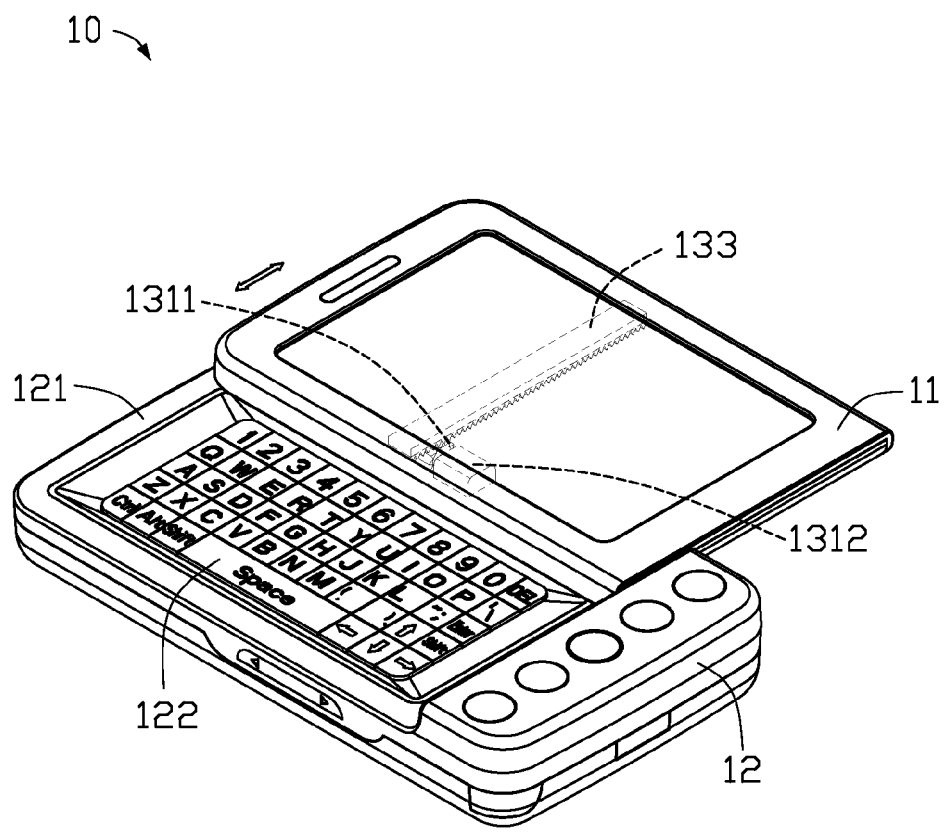
FIG. 4 is a schematic view, showing an open status of the portable electronic device shown in FIG. 2.

Referring to FIGS. 3 and 4, in assembly, the power generating device 131 is inserted into the mounting slit 124. The rack assembly 133 is inserted into the receiving cavity 1122 of the lower cover 112. The lower cover 112 is put over the body member 12, with the rack portion 1332 of the rack assembly 133 meshing with the toothed gear 1311 of the power generating device 131. At this time, the fastening holes 123 are aligned with the two sliding slots 1121. The screws 125 are inserted into the sliding slots 1121, with the screw heads 1253 screwed into the fastening holes 123. Finally the upper cover 111 is covered on the lower cover 112 and combined as a whole with the lower cover 112.

To open the cover member 11, using the switches (not shown), the power generating device 131 is controlled to start to rotate clockwise to drive the rack assembly 133 and the cover member 11 to slide relative to the body member 12 until the keypad 12 is completely exposed. To close the cover member 11, using the switches (not shown), the power generating device 131 is controlled to start to rotate reversely, i.e., counter clockwise, to drive the rack assembly 133 and the cover member 11 to slide relative to the body member 12 until the keypad 12 is completely shielded. It is needed to point out that, the power generating device 131 can control a sliding distance of the cover member 11 relative to the body member 12. Thus, the cover member 11 can stop at any distance relative to the body member according to a user's wish.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A portable electronic device comprising:
a body member defining a mounting slit;
a cover member; and
a power generating assembly comprising a power generating device mounted to the body member, the power generating device including a toothed gear, a stator and a sheath, the toothed gear being rotatably clockwise or counter clockwise mounted to the stator, and the stator received in the sheath, and the sheath being inserted in the mounting slit, and a rack assembly mounted to the cover member and having a rack portion meshing with the toothed gear in a manner that rotation of the toothed gear is converted into sliding movement of the rack assembly so as to drive the cover member to slide relative to the body member.

2. The portable electronic device as claimed in claim 1, wherein the sheath is made of rubber.

3. The portable electronic device as claimed in claim 1, wherein the cover member includes an upper cover and a lower cover, the upper cover is integrated with the lower cover.

4. The portable electronic device as claimed in claim 3, wherein the upper cover includes a screen used to display information.

5. The portable electronic device as claimed in claim 3, wherein the lower cover includes two sliding slots, the sliding slots are respectively defined through the lower cover, two corresponding fasteners are inserted into the sliding slots and fixed to the body member.

6. The portable electronic device as claimed in claim 5, wherein each fastener includes a resisting portion, a sliding portion, and a screw head, the sliding portion connects the resisting portion and the screw head, the resisting portion is between the upper cover and the lower cover, the screw head is screwed into a corresponding fastening hole, and the sliding portion is slidably received in the sliding slot.

7. The portable electronic device as claimed in claim 5, wherein the cover member defines a receiving cavity, the receiving cavity faces away from the upper cover, the receiving cavity is parallel with and sandwiched between the two sliding slots, the rack assembly is received in the receiving cavity.

8. A portable electronic device comprising:
a cover member,
a body member defining a mounting slit, the cover member being slidably mounted to the body member; and
a power generating assembly including a power generating device and a sheath, the power generating device including a stator received in the sheath, and the sheath being inserted in the mounting slit, the stator driving the cover member to slide relative to the body member.

9. The portable electronic device as claimed in claim 8, wherein the power generating device includes a toothed gear rotatable mounted to the stator and a rack assembly fixed to the cover member, the toothed gear driving the rack assembly to slide ahead or backwards relative to the body member.

10. The portable electronic device as claimed in claim 8, wherein the sheath is made of rubber.

11. The portable electronic device as claimed in claim 8, wherein the cover member includes an upper cover and a lower cover, the upper cover is integrated with the lower cover.

12. The portable electronic device as claimed in claim 11, wherein the upper cover includes a screen used to display information.

13. The portable electronic device as claimed in claim 11, wherein the lower cover includes two sliding slots, the sliding slots are respectively defined through the lower cover, two corresponding fasteners are inserted into the sliding slots and fixed to the body member.

14. The portable electronic device as claimed in claim 13, wherein each fastener includes a resisting portion, a sliding portion, and a screw head, the sliding portion connects the resisting portion and the screw head, the resisting portion is between the upper cover and the lower cover, the screw head is screwed into a corresponding fastening hole, and the sliding portion is slidably received in the sliding slot.

15. The portable electronic device as claimed in claim 13, wherein the cover member defines a receiving cavity, the receiving cavity faces away from the upper cover, the receiving cavity is parallel with and sandwiched between the two sliding slots, the rack assembly is received in the receiving cavity.

* * * * *